United States Patent
Mäkipää et al.

(12) 
(10) Patent No.: US 6,394,341 B1
(45) Date of Patent: May 28, 2002

(54) SYSTEM AND METHOD FOR COLLECTING FINANCIAL TRANSACTION DATA

(75) Inventors: Mikko Mäkipää; Olli Immonen, both of Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/382,354

(22) Filed: Aug. 24, 1999

(51) Int. Cl.[7] ............................................. G06F 17/60
(52) U.S. Cl. ...................... 235/379; 235/380; 380/24
(58) Field of Search .................................. 235/379, 380, 235/383, 462.46, 472.02; 705/39, 40, 41, 44; 380/24

(56) References Cited

U.S. PATENT DOCUMENTS

| | | | | |
|---|---|---|---|---|
| 4,277,837 A | * | 7/1981 | Stuckert | 235/379 |
| 5,221,838 A | * | 6/1993 | Gutman et al. | 235/379 |
| 6,091,817 A | * | 7/2000 | Bertina et al. | 380/9 |
| 6,142,369 A | * | 11/2000 | Jonstromer | 235/379 |
| 6,202,054 B1 | * | 3/2001 | Lawlor et al. | 705/42 |

FOREIGN PATENT DOCUMENTS

GB 2320354 * 6/1998 .................. 235/379

* cited by examiner

*Primary Examiner*—Karl D. Frech
*Assistant Examiner*—Daniel St. Cyr
(74) *Attorney, Agent, or Firm*—Antonelli, Terry, Stout & Kraus, LLP

(57) ABSTRACT

The present invention is a system and method for collecting transaction data. A system for collecting transaction data in accordance with the invention includes at least one transaction provider (12) which provides at least an electronic receipt of financial transactions offered by each transaction provider; at least one user device (14), in communication with each transaction provider, which provides to each transaction provider a selection by a user of the user device of an offered financial transaction and in response to receipt of an acceptance of the financial transaction recorded in the received electronic receipt; and at least one user information system (18), coupled to at least one of the at least one transaction provider or the at least one user device, which stores at least electronic receipts which are received from the at least one user device or the at least one transaction provider which are verified by the user information system to have been accepted by the user of the user device. At least one intermediate service provider (20) may be coupled to the at least one transaction provider processes information relating to the accepted financial transactions transmitted to the at least one intermediate service provider to produce processed information pertaining to the accepted financial transactions.

79 Claims, 9 Drawing Sheets

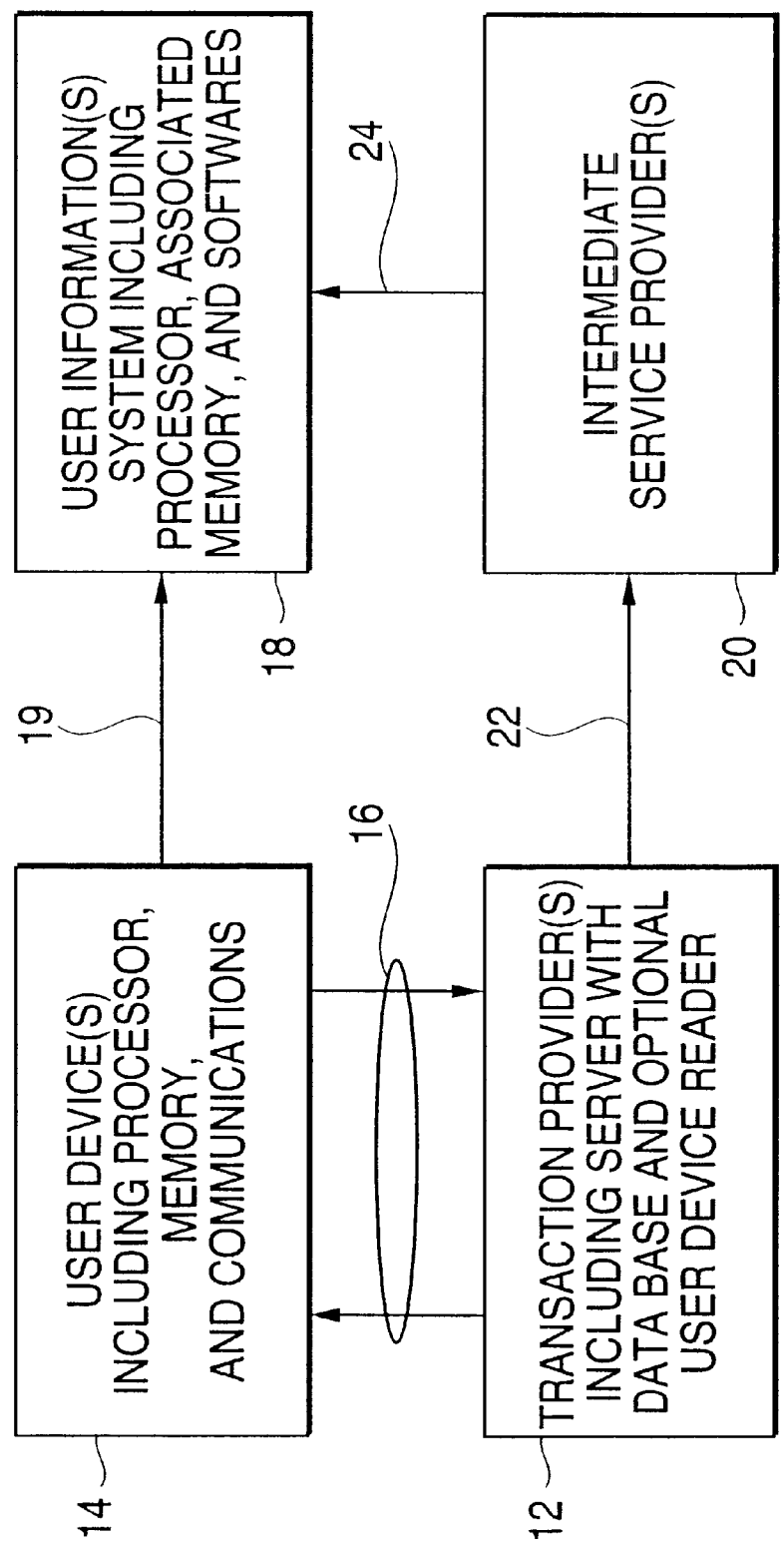

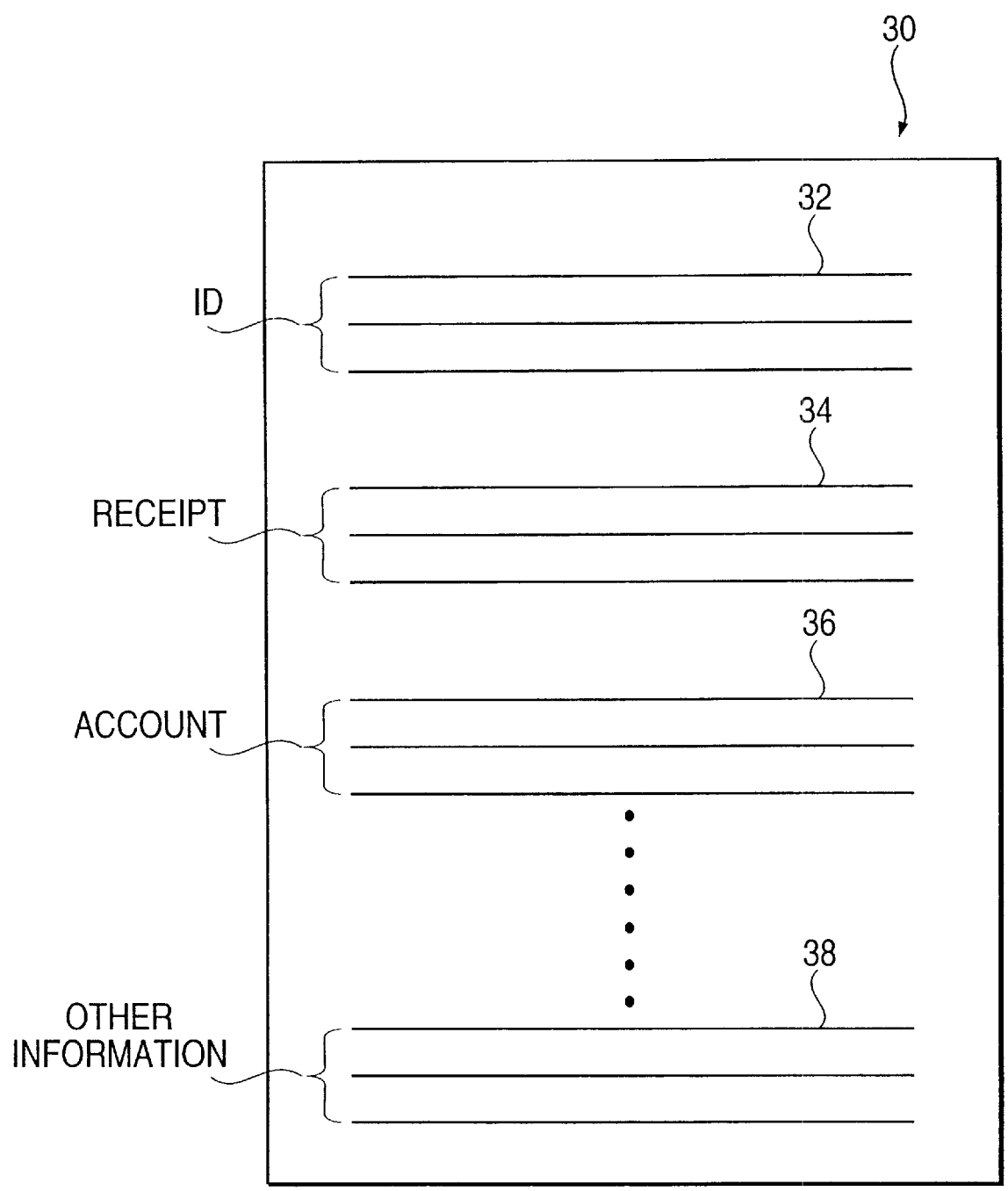

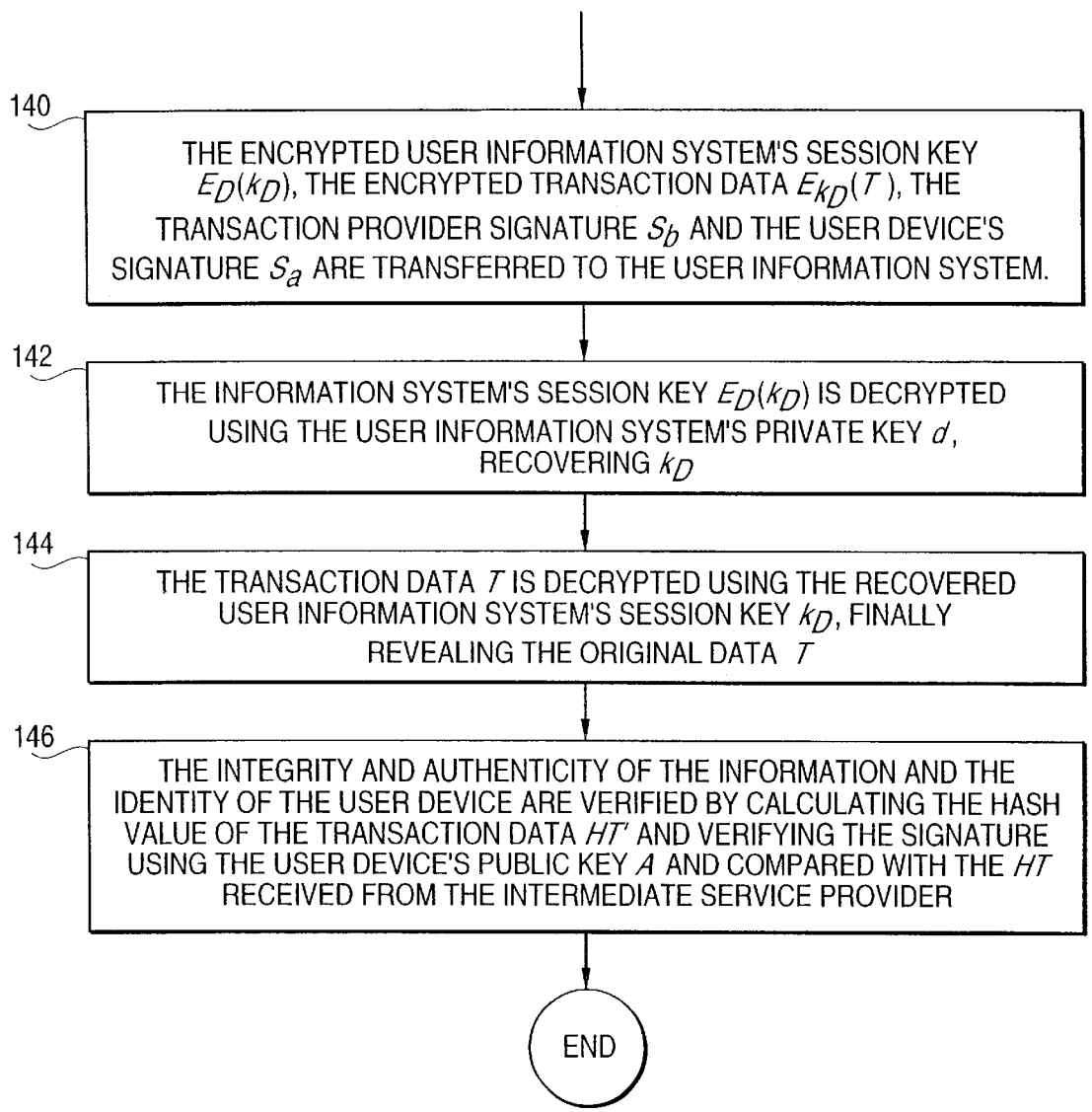

FIG. 4B

| TRANSACTION PROVIDER B |
|---|
| INPUT: <br><br> $T$, <br><br> $E_B(k_D)$, <br><br> $E_C(k_C)$, <br><br> $E_{k_C}(ID, S_a, E_D(k_D))$ |
| PROCESSING: <br><br> $HT = H(T)$, <br><br> $S_b = S_b(HT)$, <br><br> $k_D = D_b(E_B(k_D))$, <br><br> $E_{k_D}(T)$ |
| OUTPUT: <br><br> $E_{k_D}(T)$, <br><br> $HT$, <br><br> $S_b$, <br><br> $E_C(k_C)$, <br><br> $E_{k_C}(ID, S_a, E_D(K_D))$ |

FIG. 4C

| INTERMEDIATE SERVICE PROVIDER C |
|---|
| INPUT: <br><br> $E_{k_D}(T)$, <br><br> $HT$, <br><br> $S_b$, <br><br> $E_C(k_C)$, <br><br> $E_{k_C}(ID, S_a, E_D(k_D))$ |
| PROCESSING: <br><br> $k_C = D_C(E_C(k_C))$, <br><br> $ID, S_a, E_D(k_D) = D_{k_C}(E_{k_C}(ID, S_a, E_D(k_D)))$ <br><br> $HT' = V_A(S_a)$ |
| OUTPUT: <br><br> $E_D(k_D)$, <br><br> $E_{k_D}(T)$, <br><br> $S_a$ |

SYSTEM AND METHOD FOR COLLECTING FINANCIAL TRANSACTION DATA

BACKGROUND OF THE INVENTION

1. Field of the Invention

The present invention relates to systems and methods for gathering financial transaction data.

2. Description of the Prior Art

Point of sale systems are in widespread use at which a purchaser of goods or services pays with cash or a smart, credit or debit card. Transactions involving cards focus upon obtaining authorization from the credit or debit financial institution from which the purchaser is extended credit or at which a debit account is maintained and do not provide the purchaser with a detailed analysis of purchases beyond the minimum amount of information to permit the identification of the financial transaction. The information in billing statements regarding the purchased goods or services is not the equivalent of the receipt obtained at the point of sale by the purchaser. Furthermore, the monthly statement provided from the credit or debit organization contains insufficient information to be a useful tool for business and personal accounting and financial management.

The large body of information which is contained in the paperwork or otherwise associated with financial transactions generated by a point of sale or a business providing financial transactions on the internet or otherwise is not readily available electronically to the consumer of financial services. Paper receipts are voluminous to maintain and the collection of meaningful financial information based on receipts is a time intensive task for individuals and companies.

U.S. Pat. No. 4,277,837 discloses a personal portable terminal for financial transactions which facilitates electronic commerce. A personal data and storage transfer card is used in association with a personal portable terminal for continually monitoring and recording individual financial records. Verification of transactions between the user of the personal portable terminal and the party providing the transaction is facilitated. Storage is provided in the personal portable terminal which may be read out at a later date by a bank for auditing fund transfer and statement printing purposes. However, the personal portable terminal does not operate in association with a user information system which stores verified information including electronic receipts.

SUMMARY OF THE INVENTION

The present invention is a system and method for collecting data pertaining to financial transactions provided by a transaction provider which may be any form of commercial establishment, such as a point of sale for the purchase of goods or services or an entity providing electronic commerce, such as the purchase of goods or services over an IP network. The information which is collected with the present invention is utilized for business and personal accounting and financial management. The collected information includes at least an electronic receipt of the financial transaction but may also contain additional information which is stored by a user information system for facilitating business and personal accounting and financial management functions to the user. The user device communicates with the transaction provider selections of financial transactions made by the user of the user device which are offered by the user provider and information permitting the transaction provider to verify that the electronic receipt has been accepted by the user of the user device. The user information system communicates with at least one of the transaction provider or the user device and stores at least the electronic receipt which is received from the user device or the transaction provider which is verified by the user information system to have been accepted by the user of the user device. As a result of storage of at least the verified electronic receipt, the user information system becomes either a personal or business database which stores detailed information about the contents of the transaction and the individual items included in the transaction such as that which is typically recorded on a paper receipt.

The invention provides diverse benefits to users of the user device, transaction providers and intermediate service providers for developing business associated with the financial transaction. Examples are: customer buying information management, product buying information management, customer profile management, loyalty management, user information marketing, personal financial management, professional financial management and price tracking as described below.

The user information system eliminates the laborious process of collecting financial information from analysis of paper receipts. The information, including the electronic receipt which is stored by the user information system after verification, is a complete description of the financial transaction and is unlike the limited summary of information provided with a smart, credit or debit card billing statement. Instead of what amounts to a summary of each purchase which is included in a monthly statement of a smart, credit or debit card which is centered upon only the total amount of the purchase, the present invention collects substantial information about the details of each financial transaction, including an electronic receipt, any involved intermediate service provider, such as a bank or other financial institution from which smart, credit or debit services were obtained, including the identification of any accounts used for the financial transactions, the location from which the goods or services was purchased and the individual who entered into a financial transaction in a situation in which the user information system is providing storage of organizational information.

The information stored by the user information system records communications between a user of the user device and the transaction provider. As part of a financial transaction agreed upon between a user of the user device and the transaction provider, information which is normally recorded on a paper receipt is transmitted from an information storage system associated with the transaction provider to the information system associated with the user device. The communication is typified by communications between a cash register at a point of sale and the user device which the user is carrying or electronic commerce involving transaction providers which use IP networks to offer their financial transactions. The user device may use diverse types of softwares, including without limitation a personal financial assistance program or a company's accounting or operation management system. The information relating to the financial transaction including the electronic receipt may contain information facilitating automatic processing of the collected information, such as universal product codes (bar codes) representative of the financial transactions. Additionally, a user of the user device may annotate the information which is collected pertaining to all financial transactions with additional comments or classifications either at the time of entry into the financial transaction or at a later time. The storing of the information by the user information system including the electronic receipt may be in any form which facilitates personal or business accounting requirements.

The communications between the user device and the user information system may be implemented in many ways. For example, communications between the transaction provider, such as a cash register located at a retail point of sale, and the user device may be based upon low power wireless communications such as, for example, the proposed Bluetooth standard or a physical interface, such as when the user device is a card, such as a smartcard, which is inserted into a smart card reader of the transaction provider to transmit data from the card to the transaction provider regarding selections or verifications of the financial transaction, e.g. an electronic signature. The user device may contain memory and communication capabilities which facilitate the storage by the user device of at least the electronic receipt which is stored by the user information system after verification. Alternatively, the user device may communicate directly with the user information system after a verification of the financial transaction between the user and the transaction provider via communication mediums such as cellular communications using short message service (SMS). The user device may be a mobile terminal including a telephone interface with a personal digital assistant (PDA). Alternatively, the user device may contain communication capability with a IP network, such as the internet, to enter into financial transactions with the transaction provider.

While in a preferred embodiment the user device contains communication capabilities and substantial memory, the present invention is not limited to the user device having either communication capability or memory for storing electronic receipts and other information. As an alternative, the user device may be a device such as, but not limited to, a smart card which provides only a digital signature of the user to the transaction provider, which enables the transaction provider to forward at least the user authorized electronic receipt and other information to the user information system optionally through an intermediate service provider. Forwarding of at least the electronic receipt to the user information system may be directly or through the aforementioned intermediate service provider, which processes information relating to the accepted financial transaction transmitted by the transaction provider to the intermediate service provider to produce processed information pertaining to the accepted financial transactions. The intermediate service provider may be, without limitation, a financial institution, such as a bank or a smart, credit or debit card clearinghouse, which processes the information relating to the selected financial transaction against an account which the user has with the intermediate service provider.

The generation of an electronic signature by the user device has two purposes. First, the signature prevents the transaction provider or another party from falsifying the electronic receipt and other information which has been accepted by the user of the user device and furthermore, provides the transaction provider, such as a merchant with authorization, to transmit at least the electronic purchase information to the intermediate service provider, such as the user's financial institution where the amount of the transaction is posted against the user's account. The user information system provides verification of the information received from the transaction provider and may accept only information that has been properly electronically signed. Utilization of the transaction provider's information system, instead of relying upon the user's device for transmitting at least the electronic receipt, provides a substantial benefit in simplifying the user's device. Simplification of the user's device eliminates a requirement for complex communication capacity and obtains the benefit of the existing communication infrastructure associated with at least the transaction provider and optionally the intermediate service provider to facilitate communications of at least the electronic receipt to the user's information system. The association of the electronic signature with the electronic receipt permits the transaction provider to verify acceptance of the financial transaction recorded in the electronic receipt. Additionally, the storage of at least the electronic receipt, after verification of acceptance by the user information system, permits central processing immediately by the user information system. A memory of the user device, including a memory in a smartcard, provides a log of financial transactions which can be compared at a later time with the information stored in the user information system to verify that the transaction information has actually been received.

In view of the complete nature of the information contained in an electronic receipt associated with ;a financial transaction and other optional information which is gathered by the user device, suitable forms of encryption may be utilized to protect the identity of the user device and any sensitive information which is being transmitted between the user device, user information system, optional intermediate service provider and the user information system. The user device may encrypt the identity of the user from at least the transaction provider and may also encrypt the contents of the electronic receipt from being accessed by the intermediate service provider. The intermediate service provider, which may be a financial institution, may also protect the purchaser's identify when the identity of the user is encrypted with transmissions between the user device and the transaction provider.

The processing and communication capabilities of the optional intermediate service provider may be utilized in place of providing substantial processing and communication capability in the user device. When the user device has limited computing and communication capability, such limited capability may be used for the review of the electronic receipt from the transaction provider and signing thereof to permit the transaction provider to verify the transaction has been accepted by the user and then utilize either the transaction provider's or the optional intermediate service provider's additional processing and communication capability to further process or transmit at least the electronic receipt in a protected (encrypted) format to the user information system where after verification it is stored.

A system for collecting transaction data in accordance with the invention includes a transaction provider which provides at least an electronic receipt of financial transactions offered by the transaction provider; a user device, in communication with the transaction provider, which provides to the transaction provider a selection by a user of the user device of a financial transaction offered by the transaction provider and in response to receipt of an electronic receipt an acceptance of the financial transaction recorded in the electronic receipt; and a user information system, coupled to at least one of the transaction provider or the user device, which stores at least electronic receipts which are received from the user device or the transaction provider which are verified by the user information system to have been accepted by the user of the user device. The user device may be a mobile terminal in wireless communication with at least the transaction provider, a personal digital assistant in wireless communication with at least the transaction provider, or a smart card which is read by a smart card reader at the transaction provider to obtain at least the selection by the user of the financial transaction and information permitting the transaction provider to verify that the electronic receipt is accepted by the user of the user device. The user device may add to the electronic receipt additional information which is used by the user information system in processing at least the electronic receipts stored by the user information system information. The information provided by the user device to permit the transaction provider to verify that the electronic receipt is accepted may comprise an electronic signature. The user information system also may verify at least any received electronic receipts with the electronic signature. The user device may add to the electronic receipt comments from the user providing additional information about the financial transaction beyond information contained in an electronic receipt.

A system for collecting transaction data in accordance with the invention also includes a transaction provider which provides at least an electronic receipt of financial transactions obtained from the transaction provider; a user device, in communication with the transaction provider, which provides to the transaction provider a selection by a user of the user device of a financial transaction offered by the transaction provider and in response to receipt of an electronic receipt, an acceptance of the transaction recorded in the received electronic receipt; an intermediate service provider, coupled to the transaction provider, which processes information relating to the accepted financial transaction transmitted by the transaction provider to the intermediate service provider to produce processed information pertaining to the accepted financial transaction; and a user information system, coupled to the intermediate service provider, which stores at least electronic receipts which are received from the intermediate service provider which are verified by the user information system to have been accepted by the user of the user device. The intermediate service provider may be a financial institution which processes the information relating to the accepted financial transaction against an account which the user has with the intermediate service provider. The user device may add to the electronic receipt additional information which is used by the user information system in processing at least the electronic receipts stored by the user information system. The information provided by the user device to permit the transaction provider to verify that the electronic receipt is accepted may comprise an electronic signature. The user information system may also verify at least any received electronic receipts with the electronic signature. The user device may encrypt an identity of the user from at least the transaction provider. The user device may also encrypt the contents of the electronic receipt from being accessed by the intermediate service provider. The financial institution may validate the information relating to the accepted financial transaction is associated with the account of the user.

A process for collecting transaction data in accordance with the invention includes providing from a transaction provider to a user device at least an electronic receipt of a financial transaction obtained by the user from the transaction provider; providing a verification from the user device to the transaction provider that at least the electronic receipt is accepted by a user of the user device; transmitting from either the transaction provider or the user device to a user information system at least the electronic receipt; and storing at least the electronic receipt with the user information system when at least the electronic receipt is verified to have been accepted by the user of the user device. The user device may add to the electronic receipt additional information which is used by the user information system in processing at least the electronic receipt stored by the user information system. Information may be provided by the user device to the transaction provider to permit the transaction provider to verify that the electronic receipt is accepted by the user of the user device. The information system used to verify the acceptance of received electronic receipts by the user of the user device may be an electronic signature. The transaction provider may also provide to the user device electronic data identifying financial transactions which are offered by the transaction provider.

A process for collecting transaction data in accordance with the invention includes providing from a transaction provider to a user device at least an electronic receipt of a financial transaction obtained by the user from the transaction provider; providing a verification from the user device to the transaction provider that at least the electronic receipt is accepted by a user of the user device; transmitting information relating to the accepted financial transaction from the transaction provider to an intermediate service provider; processing the information relating to the accepted financial transaction by the intermediate service provider to produce processed information pertaining to the accepted financial transaction; and receiving at least the electronic receipt with a user information system from the intermediate service provider and storing at least the electronic receipt when at least the electronic receipt is verified by the user information system to have been accepted by the user of the user device. The intermediate service provider may be a financial institution which processes the information relating to the accepted financial transaction against an account which the user has with the intermediate service provider. The user device may add to the electronic receipt additional information which is used by the user information system in processing at least the electronic receipt stored by the user information system. Information is provided by the user device to the transaction provider to permit the transaction provider to verify that the electronic receipt is accepted. The information may comprise an electronic signature. The user device may encrypt an identity of the user from at least the transaction provider. The financial institution may validate the information relating to the accepted financial transaction is associated with the account of the user. The financial institution may provide information to the user information system that the financial transaction has occurred between the user and transaction provider.

The transaction provider and the intermediate service provider perform the following functions: the intermediate service provider may provide the transaction provider with an analysis of financial transactions accepted by the user of the user device which may be a statistical analysis; the transaction provider may provide an analysis of sales of particular types of financial transactions to manufacturers of products which are involved with the sale which may involve at least one of location and time that the sales were made; the transaction provider may create profiles of a user of the user device based on types of purchases which are made; the transaction provider may provide a tabulation of purchases made by users of the user device which may be provided by the transaction provider to a manufacturer of products purchased with each financial transaction; the intermediate service provider may provide a history of a user financial transaction to another for a benefit of the user; the intermediate service provider may provide a user of the user device with an analysis of the users history of financial transactions which may identify types of financial transactions which the user has accepted and the analysis group products which are involved in financial transactions according to categories; the analysis may compare the user's history of financial transactions with a history of financial transactions of others; and the user device may be used by members of an organization and information of multiple users is combined in the user information system.

A system for collecting transaction data in accordance with the invention includes a plurality of transaction providers, each transaction provider providing at least an electronic receipt of financial transactions obtained therefrom; a plurality of user devices, in communication with the plurality of transaction providers, which provide to at least one transaction provider a selection by a user of each user device of a financial transaction offered each transaction provider and in response to receipt of an electronic receipt an acceptance of the transaction recorded in the received electronic receipt; at least one intermediate service provider, coupled to each transaction provider, which processes information relating to the accepted financial transaction transmitted by each transaction provider to the at least one intermediate service provider to produce processed information pertaining to the accepted financial transaction; and at least one user information system, coupled to at least one intermediate service provider, each user information system storing at least electronic receipts which are received from each intermediate service provider which are verified by the at least one user information system to have been accepted by the user of each user device. The intermediate service provider may provide to at least one user of the user devices information on price differences at different locations at which the plurality of transaction providers are located.

BRIEF DESCRIPTION OF THE DRAWINGS

FIG. 1 illustrates a block diagram of an embodiment of a system for collecting transaction data in accordance with the present invention.

FIG. 2 illustrates an example format of at least the electronic receipt which is stored by a user information system in accordance with the present invention.

FIGS. 3A–3C illustrate a flowchart of one embodiment of a process for collecting transaction data in accordance with the present invention.

FIGS. 4A–4D illustrate the inputs, processes and the outputs of the process of FIGS. 3A–3C.

Like reference numerals identify like parts throughout the drawings.

DESCRIPTION OF THE PREFERRED EMBODIMENTS

Figure 3A:
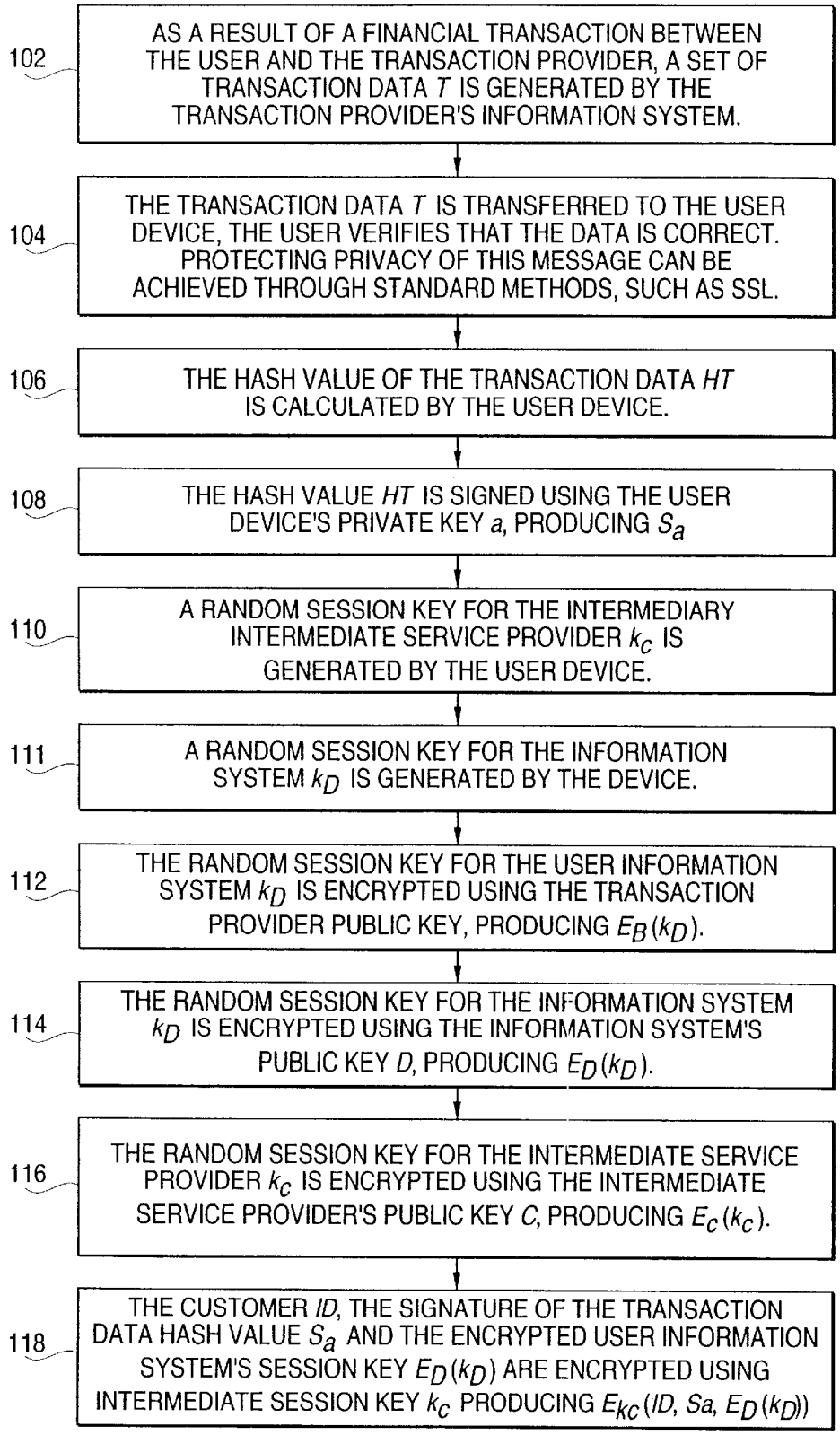

FIG. 1 illustrates a block diagram of a system 10 for collecting transaction data in accordance with the invention. Financial transactions and financial data should be understood to describe without limitation any transaction which involves exchange of monetary or other value between the user(s) of at least one user device 14 and at least one transaction provider 12. The system 10 is comprised of at least one transaction provider 12, at least one user device 14 which communicates with the transaction provider 12 over either a physical connection, wireline or a wireless communication link 16, at least one user information system 18, which communicates with the user device 14 over a communication link 19, which may be wireless or wireline or through at least one intermediate service provider 20 which communicates directly with the transaction provider 12 over a communication link 22, which may be wireless or wireline, and directly by communication link 24 with the user information system which may be either a wireless or a wireline link. It should be understood that only a single translation provider 12, user device 14, user information system 18 and intermediate service provider 20, have been illustrated for the purpose of simplifying illustration of a system in accordance with the present invention but, in practice, the invention is practiced with plural transaction providers, user devices, user information systems and intermediate service providers and the necessary illustrated communication links 16, 20, 22 and 24.

The transaction provider 12 may be, without limitation, any entity which provides financial transactions, such as, but not limited to, a retail organization, any point of sale (POS) entity or an entity providing electronic commerce, such as entities operating on IP networks. The transaction provider 12 may include a server with a database which manages the generation of electronic receipts by the transaction provider in response to selection of financial transactions offered by the transaction provider 12 by the user of the user device 14 and further verification that the electronic receipt transmitted by the transaction provider 12 to the user device 14 has been accepted by the user device to be correct. The verification of acceptance of at least the electronic receipt by the transaction provider 12 may be an electronic signature generated by any known technique or mechanism and provides the legal basis for the transaction provider to signal the intermediate service provider 20 that the financial transaction has been accepted by the user of the user device. Without limitation, the intermediate service provider typically is a financial institution offering smart, credit or debit services to the user of the user device 14 which the user has authorized to be processed by the financial transaction against the user's account. The transaction provider 12 in a retail or other point of sale configuration typically contains a register for storing cash and smart, credit or debit card receipts and processing and communication capability for management of inventory, etc. and communication capability directly (not illustrated) with the user information system 18 or with the intermediate service provider 20. The transaction provider 12 may transmit substantial information over the communications link 16 to the user device 14 which advertises or otherwise communicates information about a wide range of financial transactions which are offered by the transaction provider in order to induce the user of the user device 14 1o enter into financial transactions with the transaction provider 12. The user device 14, may be diverse in nature and may be a smart card, a mobile terminal including a wireless, telephone or short range wireless communication link, such as the proposed Bluetooth specification, a PDA, etc. The user device 14 typically contains a processor and associated memory and the aforementioned communication capability providing communications over links 16 and 20.

The transaction provider 12 provides at least an electronic receipt of financial transactions offered, by the transaction provider to the user of the user device 14 but typically also provides electronic data transmissions identifying financial transactions which are offered by the transaction provider which is a mechanism to induce purchase by the user of the user device 14 of financial transactions offered by the transaction provider 12. The user device 14 communicates over communication link 16 with the transaction provider 12 a selection by the user of the user device of a financial transaction offered by the transaction provider. Additionally, information is provided by the user device 14 to the transaction provider 12, after receipt by the user device of the electronic receipt, permitting the transaction provider to verify that the electronic receipt is accepted by the user. This verification information may without limitation be an electronic signature or simply an acknowledgment that the information contained in an electronic receipt transmitted by the transaction provider 12 to the user device 14 is acknowledged by the user of the user device to be accepted as a binding transaction.

The user information system 18 includes a processor and associated memory which stores at least electronic receipts which are received from the user device via direct communications over communication link 19 or, alternatively, by communication from the user device 14 over communication link 16 to the transaction provider 12, from the transaction provider 12 over communication link 22 to the intermediate service provider 20 and from the intermediate service provider 20 over communication link 24 to the user information system or directly from the transaction provider 22 such as when the intermediate service provider 20 is not present or is not operative. The user information system 18 includes softwares which process; at least the electronic receipt to permit verification as accepted by the user of the user device before storage in the memory. If the user information system 18 is an organization's system, such as a company, the processor may be in a server or part of a network of computers of the organization. The softwares may be diverse in nature and may include without limitation programs for accounting and financial management of the user of the user device 14 and decrypting of information as described below in FIGS. 3A–3C. These softwares provide a basis for decision making and maintaining personal or company budgets to provide prudent financial management and furthermore, facilitate the collection of transaction information in electronic form in the same manner in which the information was created by the transaction provider 12 as accepted by the user of the user device 14.

A preferred form of verification utilizes an electronic signature generated by the user of the user device 14. The electronic signature, generated by any known technique, which is transmitted by the user device 14 to the transaction provider 12 in response to receipt of at least an electronic receipt from the transaction provider, permits the transaction provider to authorize the intermediate service provider 20 to post the financial transaction against the smart, credit or debit account of the user of the user device 14 maintained by the intermediate service provider 20 which may be a bank or other financial institution. In addition to the approval of the electronic receipt and the financial transaction, additional information may be associated with the financial transaction by the user of the user device which is used by the user information system 18 in processing at least the electronic receipt stored by the user information system memory. Such additional information may be comments or personal annotations provided by the user of the user device 14 or information to be used during a processing of at least the electronic receipt by the user information system including software, etc. The electronic signature which is added by the user of the user device 14 to the electronic receipt prevents the transaction provider or a third party from falsifying the information of the accepted electronic receipt end further provides a preferred basis for the user information system 18 to verify that information transmitted thereto is information accepted by the user of the user device which should be stored in the memory in the user information system.

In view of the sensitivity of the substantial quantity of information which may be generated by the transaction provider 12 in the electronic receipt and further personal information which the user of the user device 14 may wish to annotate or otherwise associate with the electronic receipt in confidential form which is safeguarded from being disclosed or available to unauthorized individuals, it is possible to conceal the user's identity from the transaction provider and details of the financial transaction other than those necessary to perform smart, credit or debiting services on behalf of the user of the user device 14 by the intermediate service provider 20. This concealment may be accomplished by any known encrypted/decryption processes.

FIG. 2 illustrates an example of user information 30 which is stored in the memory of the user information system 18 including an electronic receipt 34. It should be understood that the user information 30 is only exemplary of possible types of information which may be stored and the form of storage of information stored by the user information system 18. The user information 30 includes identification information 32 of the user device 14 which may be of any diverse type, such as a social security number or other individual identification issued by countries of the user, company, etc., an electronic receipt 34, account information 36, and other information 38. The identification information 32 is utilized in the process described below in conjunction with FIGS. 3A–3C and FIGS. 4A–4D at least to obtain the address of the user identification information system 18 to which information is transmitted by the intermediate service provider 20 but may have other functions. The electronic receipt 34 may contain a whole host of identifying information regarding the financial transaction, such as, but not limited to, the information which is provided on a paper receipt but also including additional information such as product attributes, quantity, manufacturers's identity, EAN codes, such as a UPC code, which may be stored in any agreed upon format. The electronic receipt 34 is information which in the prior art was not provided by the billing statements from intermediate service providers 20 to the user in a normal smart, credit or debit card statement provided on a monthly basis and is the information which is highly useful in the user's accounting and/or financial management functions and further, to the transaction provider 12, the user of the user device 14 and the intermediate service provider 20 as a source of beneficial or saleable information as described below. The account information 36 is the customary information, such as a smart, credit or debit account number or other identification of services provided by the intermediate service provider 20. Finally, the other information 38 is symbolic of diverse forms of information which the user of the user device 14 wishes to store in the memory of the user information system 18 or otherwise use during the processing of information received by the user information system prior to storage in the memory and may without limitation include comments provided by the user of the user device 14 which annotate the particular financial transaction represented by the user information 30 and any softwares used to support storage or processing of the user information. The other information 38 may also be the source of information sold by the transaction provider 12 and/or the intermediate service provider 20 to the third parties as described below. It should be understood that the user information system 18 may be a company financial information system implemented in a server, an individual's home PC or otherwise.

The transaction provider 12 and the intermediate service provider 20 have a number of attractive possibilities for developing a business around the financial transaction information generated between the transaction provider and the user device 14. The categories of information are as follows:

1. CUSTOMER BUYING INFORMATION MANAGEMENT

Most importantly, if the customer identity is hidden by encryption or otherwise from the transaction provider 12, the transaction provider has no way of identifying repeated purchases by the same customer. The intermediate service provider 20 may provide transaction providers 12 with statistical analysis of their customer's buying habits, or if allowed by the user, even the complete anonymous buying histories of single users. Additionally, if one transaction provider 12 serves multiple transaction provider locations of the same type, for example grocery stores, the transaction provider 12 may provide information on how the buying patterns of the customers of one store are different from buying patterns in other stores or buying patterns in general. This may take place, again, without revealing information of any other individual store.

2. PRODUCT BUYING INFORMATION MANAGEMENT

The same kind of analysis as consumer buying information is also possible on the product level. The transaction provider 12 may give product manufacturers information about how the sales of the product vary in different locations and at different times. Also, the buying histories of customers who have purchased the product can be compared to those who have not done so, or to those who have bought a competing product. This information can be used to analyze the segmentation of the market, for example to find that product A is favored over product B by heavy users. Buying of certain products together (e.g. refreshments) can also be analyzed.

3. CUSTOMER PROFILE MANAGEMENT

The transaction provider 12 can create profiles of customers based on their buying behavior. This information may be sold to third parties in an anonymous format and linked to other analysis.

4. LOYALTY MANAGEMENT

The transaction provider 12 can act as a loyalty scheme manager for transaction providers, or for product manufacturers. The transaction provider can prove for the transaction provider, that a certain number of purchases have been made by a certain user that gives the customer the right to receive some benefit (or that any other condition is fulfilled). If the user wishes, the user may reveal its identity to the transaction provider 12 in exchange for the benefit.

On the product buying level, the transaction provider 12 can accumulate purchases independent of the buying location (e.g. a certain grocery chain). For example, if a user buys Coca Cola® from different locations for a certain amount during a given period, the transaction provider may inform the user is eligible for a bonus CD from the Coca Cola Company.

5. USER INFORMATION MARKETING

More generally, the intermediary service provider 20 may market the information to third parties about the user's buying history in behalf of the user, who wants to receive money or other benefits in exchange. In this case, it is again essential that the user's identity can be protected from the transaction provider 12 by encryption or other techniques.

6. PERSONAL FINANCIAL MANAGEMENT

The intermediate service provider 20 may provide the users with a service detailing their consumption habits and history. This kind of service can be provided over the web or by using standard data formats for personal financial management software (i.e. Quicken).

The service can both give detailed records of committed purchases to the user, but in addition, to group products to categories. This way the user can for example follow, how much money has been used for food, clothing, home, car, amusement and other major categories at different times.

This information can be connected to financial planning applications, to enable the user to plan and follow their consumption in detail. The intermediate service provider 20 may provide the user with such planning services as well.

The service can also compare the purchasing behavior of the user, or user's household, to other similar users to show how the behavior differs from the typical user with the same background and income level.

Additionally, the information of purchases can be linked to other sources of information. For example, the purchased food items can be mapped to corresponding nutritional information, to provide the user with an indication of the healthiness of his diet.

7. PROFESSIONAL FINANCIAL MANAGEMENT

When a financial management service is provided to a commercial company, the information from multiple users can be automatically combined. Moreover, the information of purchases is available in almost real time, which may be significant to a large travelling work force or multiple remote sites.

8. PRICE TRACKING

The intermediate service provider 20 may provide users with information on price differences in different locations. It may allow the user to search for the lowest price of a product in an area, or calculate price indexes for groups of products, such as groceries. Moreover, it can compare the prices of a user's buying history at different locations to suggest the one that would have been the most inexpensive for the user.

Figure 3B:
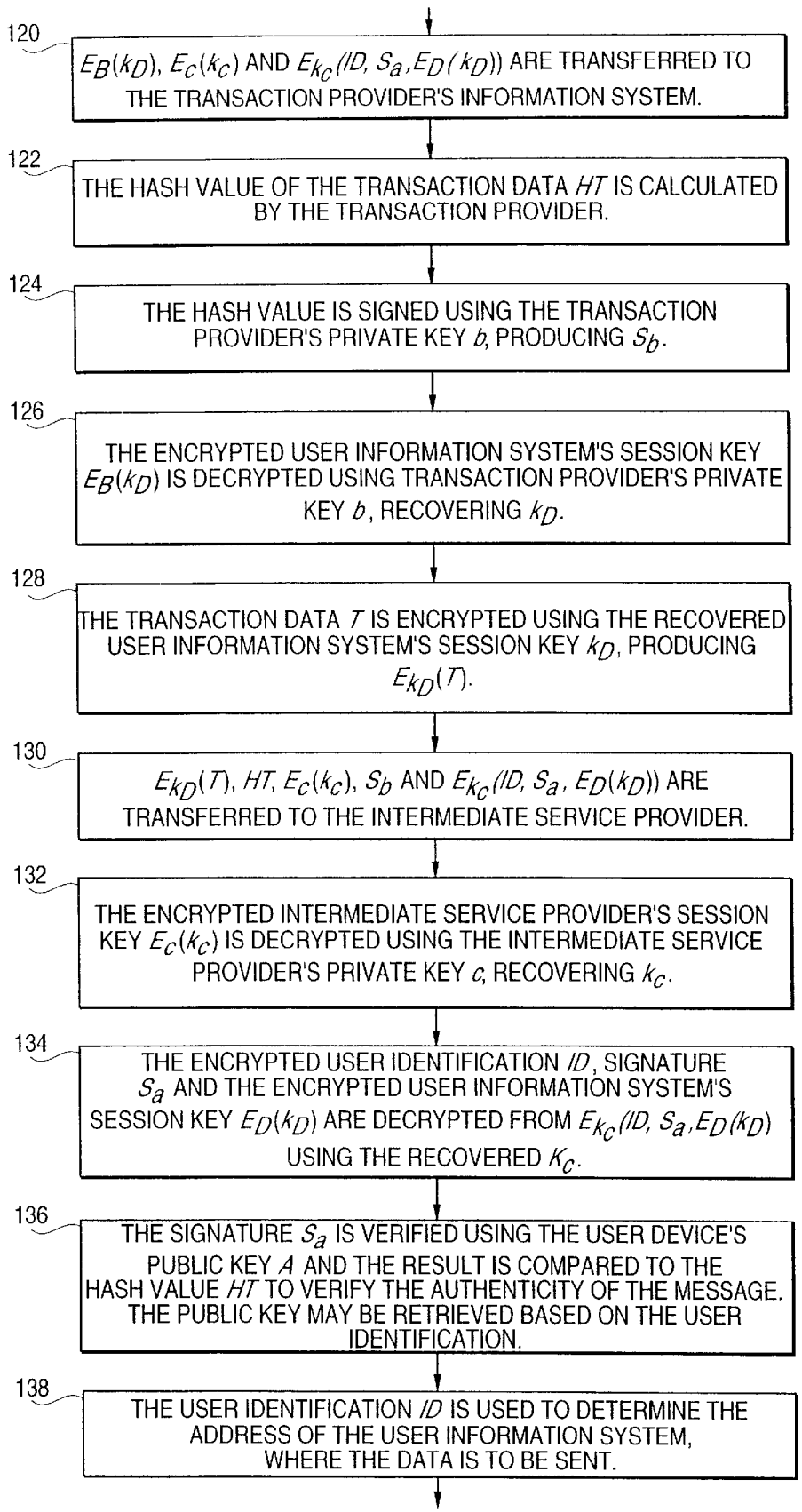
Figure 4A:
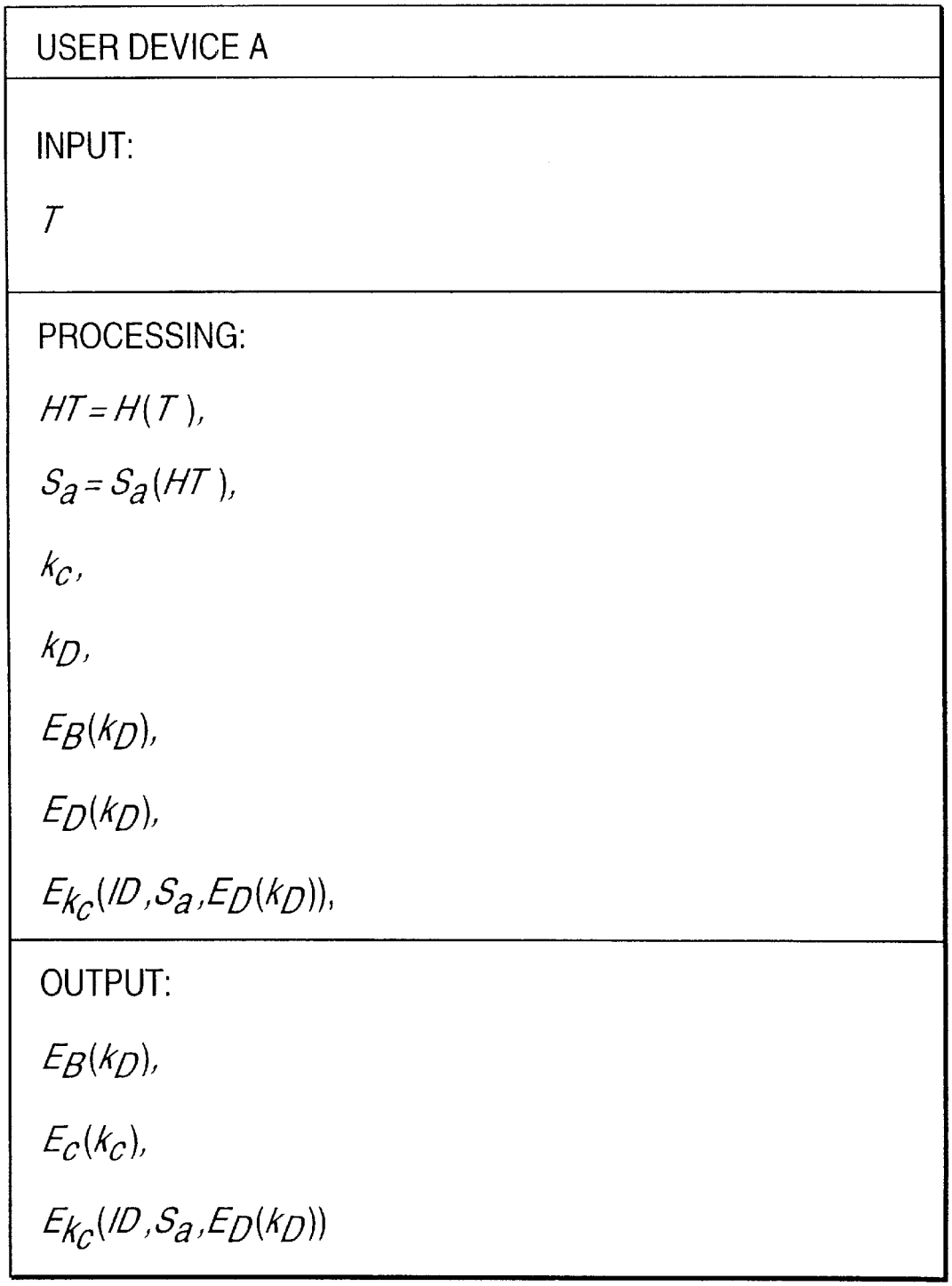
Figure 4D:
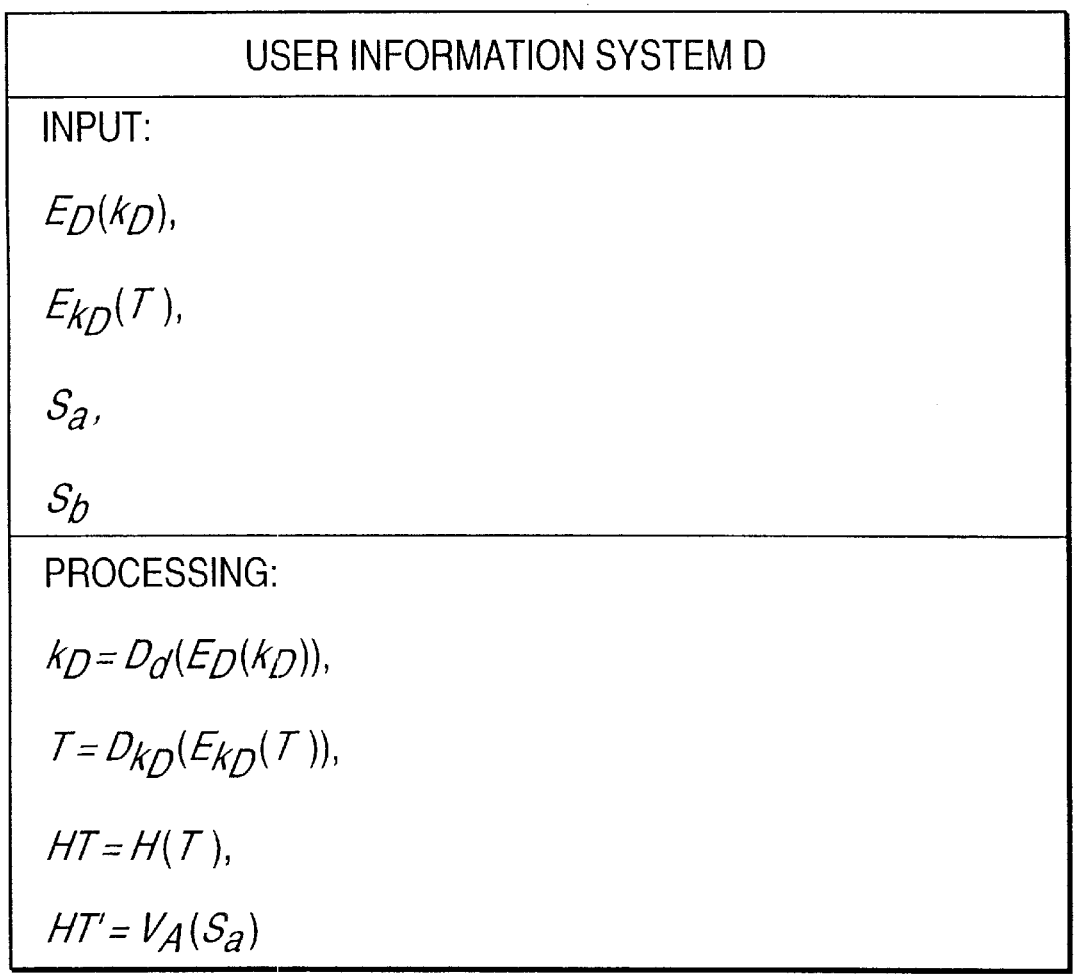

FIGS. 3A–3C illustrate a preferred embodiment of a process for collecting transaction data in accordance with the present invention which uses available cryptographic methods involving random session keys encrypted using public key cryptology. The described embodiment includes a protocol which hides the user's identity from the transaction provider 12 and optionally, the intermediate service provider 20 when desirable. The intermediate service provider 20 validates the information pertaining to the financial transaction and the user's identity and only allows the validated information to be processed. The aforementioned encryption also protects against third party unauthorized access when information is being transmitted between the various parts of the system of FIG. 1. The process for collecting transaction information further permits verification that all of the transactions which have take place are correctly reported to the user information system.

Prior to description of each of the steps in FIGS. 3A–3C, the following notations are defined as used in FIGS. 3A–3D and 4A–4D:

$E_k(M)$ Encryption of message M, using key k $S_k(M)$ Signature of message M, using key k $D_k(M)$ Decryption of message M, using key k $V_k(M)$ Verfication of message M, using key k H(M) A one-way hash value of a message M $k_p$ A randomly generated session key for party P A The user device 14

B The transaction provide 12

C The intermediate service provider 20

D The user information system 18

T A message containing the transaction data

HT=H(T) Hash value of the transaction data

ID Customer identification $k_c$ A random session key for the intermediate service provider 20

$E_{k_c}()$ Encryption using the intermediate service provider's session key $k_D$ A random session key for the user information system 18

$E_{k_D}()$ Encryption using the user information system's session key $E_B()$ Encryption using the transaction provider's public key $E_C()$ Encryption using the intermediate service provider's public key $E_D()$ Encryption using the user information system's public key $D_b()$ Decryption using the transaction provider's private key $D_c()$ Decryption using the intermediate service provider's private key $D_d()$ Decryption using the user information system's private key $S_a=S_a(HT)$ Signature of the transaction data hash value generated by the user device 14

$S_b=S_b(HT)$ Signature of the transaction data hash value generated by the transaction provider With reference to FIGS. 3A–3C, the process 100 starts at point 102 where a financial transaction has occurred between the user of the user device 14 and the transaction provider 12 which results in a set of transaction data T being generated by the transaction provider's information system. The process proceeds to step 104 where the transaction data T is transferred to the user device 14 and the user device verifies that the data is correct. Protection of privacy of this message can be achieved through standard methods such as SSL. Processing proceeds to step 106 where the hash value of the transaction data HT is calculated by the user device 14. Processing proceeds to step 108 where the hash value HT is signed by the user using the user device's private key "a" producing the quantity $S_a$. Processing proceeds to step 110 where a random session key $K_c$ for the intermediate service provider 20 is generated by the user device 14. Processing proceeds to step 111 where a random session key $k_D$ for the user information system is generated by the user device 14. Processing proceeds to step 112 where the random session key $k_D$ for the user information system 18 is encrypted using the transaction provider's public key, producing $E_B(k_D)$. Processing proceeds to step 114 where the random session key $k_D$ for the user information system 18 is encrypted using the user information system's public key D, producing $E_D(k_D)$. Processing proceeds to step 116 where the random session key $k_c$ for the intermediate service provider 20 is encrypted using the intermediate service provider's public key C, producing $E_C(k_C)$. Processing proceeds to step 118 where the customer identification ID, the signature of the transaction data hash value $S_a$ and the encrypted user information system's session key $E_D(k_D)$ are encrypted using the intermediate service provider's session key $k_C$, producing $E_{k_c}$, ID, $S_a$, $E_D(k_D)$. Processing proceeds to step 120 where the quantities $E_B(k_D)$, $E_c(k_c)$ and $E_{k_c}(ID, S_a, E_B(k_D))$ are transferred to the transaction provider's information system. Processing proceeds to step 122 where the hash values of the transaction data HT is calculated by the transaction provider. Processing proceeds to step 124 where the hash value is signed using the transaction provider's private key "b" producing $S_b$. Processing proceeds to step 126 where the encrypted user's information system's session key $B_b(k_D)$ is decrypted using the transaction provider's private key "b", recovering $k_D$. Processing proceeds to step 128 where the transaction data T is encrypted using the recovered user information system's session key $k_D$, producing $E_D(T)$. Processing proceeds to step 130 where the quantities; $E_kD(T)$, HT, $E_c(k_C)$, $S_b$ and $E_kC(ID)$, $S_a$, $E_D(k_D)$) are transferred to the intermediate service provider 20. Processing proceeds to step 132 where the encrypted intermediate service provider's session key $E_C(k_C)$ is decrypted using the intermediate service provider's private key "c", recovering $k_C$. Processing proceeds to step 134 where the encrypted user identification ID, signature $S_a$ and the encrypted user information system's session key $E_D(k_D)$ are decrypted from $E_{k_c}(ID)$, $S_a$, $E_D(k_D)$) using recovered $k_c$. Processing proceeds to step 136 where the signature $S_a$ is verified using the user device's public key A and the result is compared to the hash value HT to verify the authenticity of the message. The public key may be retrieved based upon the customer identification. Processing proceeds to step 138 where the customer identification ID is used to determine the address of the user information system where the data is to be sent. Processing proceeds to step 140 where the encrypted user information system's session key $E_D(k_D)$, the encrypted transaction data $E_kD(T)$, the transaction provider's signature $S_b$ and the user device's signature $S_a$ are transferred to the user information system 18. Processing proceeds to step 142 where the user information system's session key $S_D(k_D)$ is decrypted using the user information system's private key "d", recovering $k_D$. Processing proceeds to step 144 where the transaction data T is decrypted using the recovered user identification system's session key $k_D$, finally revealing the original transaction data T. Processing proceeds to step 146 where the integrity and authenticity of the transaction data and the identity of the user device are verified by calculating the hash value of the transaction data HT' and verifying the signature using the user's public key A and compared with the HT received from the intermediate service provider 20 which is the end of the process.

FIGS. 4A–4D identify the inputs, processings and outputs respectively of the user device 14, transaction provider 12, intermediate service provider 20 and user information system 18 of the process of FIGS. 3A–3C. The letter identifications "A–D" are respectively used in the various subscripts contained in the inputs, processings and outputs of the process of FIGS. 3A–3C to respectively identify the transaction provider 12, user device 14, user information system 18, and the intermediate service provider 20.

Additionally, the intermediate service provider 20 may have the electronic receipt and additional information transmitted thereto from the transaction provider 12 in non-encrypted form in order to permit the intermediate service provider to achieve profits or otherwise make financial use of the information therein as described above. This may be achieved by transmitting the information from the transaction provider 12 to the intermediate service provider 20 using a hybrid encryption based upon the intermediate service provider's public key.

Furthermore, if the intermediate service provider stores both $S_a$ which equals $S_a(HT)$ and $S_b$ equal $S_b(HT)$, disputes may later be resolved by the intermediate service provider between the user of the user device 14 and the transaction provider 12. If either the user of the user device 14 or the transaction provider 12 reveals the transaction data T, the intermediate service provider 20 may calculate if the quantity HT equals H(T) and then verify whether the information was authenticate using the corresponding public keys.

Similarly, the signature $S_b$ may be transferred to the user device 14, which encrypts the signature using the intermediate service provider's session key before sending it forward. A log of all transaction times and signatures is therefore retained in the user device 14. If the user information system 18 has not received all transactions stored in the log, the user's possession of the signature may be used to prove that a questioned transaction actually took place.

Additionally, the intermediate service provider 20 may return a receipt of the received information to the transaction provider 12 thereby noting that the information transmitted by the transaction provider to the intermediate service provider was received correctly.

Finally, a simple protocol may be used to detect the comments and other information produced by the customer which do not pertain to the more sensitive electronic receipt and other transaction data.

While the invention has been described in terms of its preferred embodiments, it should be understood that numerous modifications may be made thereto without departing from the spirit and scope of the invention as defined in the appended claims. It is intended that all such modifications fall within the scope of the appended claims.

What is claimed is:

1. A system for collecting transaction data comprising:
    a transaction provider which provides at least an electronic receipt of financial transactions offered by the transaction provider;
    a user device, in communication with the transaction provider, which provides to the transaction provider a selection by a user of the user device of a financial transaction offered by the transaction provider and the user device in response to receipt of an electronic receipt provides an acceptance of the financial transaction recorded in the received electronic receipt to the transaction provider; and
    a user information system, coupled to at least one of the transaction provider or the user device, which stores at least electronic receipts which are received from the user device or the transaction provider which are verified by the user information system to have been accepted by the user of the user device.

2. A system in accordance with claim 1 wherein:
    the user device is a mobile terminal in wireless communication with at least the transaction provider.

3. A system in accordance with claim 2 wherein:
    the user device adds to the electronic receipts additional information which is used by the user information system in processing at least the electronic receipts stored by the user information system.

4. A system in accordance with claim 1 wherein:
    the user information system comprises a processor and a memory with the memory storing at least electronic receipts only after the verification of acceptance of the electronic receipts by the user; and
    the processor provides at least one of accounting service and financial management service to the user.

5. A system in accordance with claim 4 wherein:
    the user device adds to the electronic receipt additional information which is used by the user information system in processing at least the electronic receipts stored by the user information system.

6. A system in accordance with claim 4 wherein:
    the user information system stores in the memory transaction information of the user, is operated by a company physically separated from the user and is connected to the user device by a wireless link.

7. A system in accordance with claim 1 wherein:
    the user device is a smart card which is read by a smart card reader at the transaction provider to obtain at least the acceptance by the user of the financial transaction and the information permitting the transaction provider to verify that the electronic receipt is accepted by the user of the user device.

8. A system in accordance with claim 7 wherein:
    the user device adds to the electronic receipt additional information which is used by the user information system in processing at least the electronic receipts stored by the user information system.

9. A system in accordance with claim 7 wherein:
    the information provided by the user device to the transaction provider to permit the transaction provider to verify that the electronic receipt is accepted by the user of the user device comprises an electronic signature.

10. A system in accordance with claim 9 wherein:
    the user information system also verifies at least any received electronic receipts with the electronic signature.

11. A system in accordance with claim 1 wherein:
    the user device adds to the electronic receipt additional information which is used by the user information system in processing at least the electronic receipts stored by the user information system.

12. A system in accordance with claim 11 wherein:
    the information provided by the user device to the transaction provider to permit the transaction provider to verify that the electronic receipt is accepted by the user of the user device comprises an electronic signature.

13. A system in accordance with claim 11 wherein:
    the user information system also verifies at least any received electronic receipts with the electronic signature.

14. A system in accordance with claim 1 wherein:
    the user device adds to the electronic receipt comments from the user providing additional information about the financial transaction beyond information contained in an electronic receipt.

15. A system in accordance with claim 1 wherein:
    the information provided by the user device to the transaction provider to permit the transaction provider to verify that the electronic receipt is accepted by the user of the user device comprises an electronic signature.

16. A system in accordance with claim 10 wherein:
    the user information system also verifies at least any received electronic receipts with the electronic signature.

17. A system in accordance with claim 1 wherein:
    the transaction provider also provides to the user device electronic data identifying financial transactions which are offered by the transaction provider.

18. A system for collecting transaction data comprising:
    a transaction provider which provides at least an electronic receipt of financial transactions obtained from the transaction provider;
    a user device, in communication with the transaction provider, which provides to the transaction provider a selection by a user of the user device of a financial transaction offered by the transaction provider and the user device in response to receipt of an electronic receipt provides an acceptance of the financial transaction recorded in the received electronic receipt to the transaction provider;
    an intermediate service provider, coupled to the transaction provider, which processes information relating to the accepted financial transaction transmitted by the transaction provider to the intermediate service provider to produce processed information pertaining to the accepted financial transaction; and a user information system, coupled to the intermediate service provider, which stores at least electronic receipts which are received from the intermediate service provider which are verified by the user information system to have been accepted by the user of the user device.

19. A system in accordance with claim 18 wherein:

the intermediate service provider is a financial institution which processes the information relating to the accepted financial transaction against an account which the user has with the intermediate service provider.

20. A system in accordance with claim 19 wherein:

the user device adds to the electronic receipt additional information which is used by the user information system in processing at least the electronic receipts stored by the user information system.

21. A system in accordance with claim 20 wherein:

the information provided by the user device to permit the transaction provider to verify that the electronic receipt is correct comprises an electronic signature.

22. A system in accordance with claim 21 wherein:

the user information system also verifies at least any received electronic receipts with the electronic signature.

23. A system in accordance with claim 19 wherein:

the information provided by the user device to permit the transaction provider to verify that the electronic receipt is correct comprises an electronic signature.

24. A system in accordance with claim 23 wherein:

the user information system also verifies at least any received electronic receipts with the electronic signature.

25. A system in accordance with claim 19 wherein:

the user device encrypts an identity of the user from at least the transaction provider.

26. A system in accordance with claim 25 wherein:

the user device also encrypts contents of the electronic receipt from being accessed by the intermediate service provider.

27. A system in accordance with claim 19 wherein:

the financial institution validates the information relating to the selected financial transaction is correct as associated with the account of the user.

28. A system in accordance with claim 27 wherein:

the financial institution provides information to the user information system that the financial transaction has occurred between the user and transaction provider.

29. A system in accordance with claim 18 wherein:

the user device adds to the electronic receipt additional information which is used by the user information system in processing at least the electronic receipts stored by the user information system.

30. A system in accordance with claim 29 wherein:

the information provided by the user device to permit the transaction provider to verify that the electronic receipt is correct comprises an electronic signature.

31. A system in accordance with claim 30 wherein:

the user information system also verifies at least any received electronic receipts with the electronic signature.

32. A system in accordance with claim 29 wherein:

the user device encrypts an identity of the user from at least the transaction provider.

33. A system in accordance with claim 32 wherein:

the user device also encrypts contents of the electronic receipt from being accessed by the intermediate service provider.

34. A system in accordance with claim 18 wherein:

the information provided by the user device to permit the transaction provider to verify that the electronic receipt is correct comprises an electronic signature.

35. A system in accordance with claim 34 wherein:

the user information system also verifies at least any received electronic receipts with the electronic signature.

36. A system in accordance with claim 35 wherein:

the user device encrypts an identity of the user from at least the transaction provider.

37. A system in accordance with claim 36 wherein:

the user device also encrypts contents of the electronic receipt from being accessed by the intermediate service provider.

38. A system in accordance with claim 34 wherein:

the user device encrypts contents of the electronic receipt from at least the transaction provider.

39. A system in accordance with claim 38 wherein:

the user device also encrypts contents of the electronic receipt from being accessed by intermediate service provider.

40. A system in accordance with claim 18 wherein:

the user device encrypts an identity of the user from at least the transaction provider.

41. A system in accordance with claim 40 wherein:

the user device also encrypts contents of the electronic receipt from being accessed by the intermediate service provider.

42. A system in accordance with claim 18 wherein:

the user information system comprises a processor and a memory with the memory storing at least electronic receipts only after the verification of acceptance of the electronic receipts by the user; and the processor provides at least one of accounting service and financial management service to the user.

43. A system in accordance with claim 18 wherein:

the user information system stores in the memory transaction information of the user, is operated by a company physically separated from the user and is connected to the user device by a wireless link.

44. A process for collecting transaction data comprising:

providing from a transaction provider to a user device at least an electronic receipt of a financial transaction obtained by the user from the transaction provider;

providing a verification from the user device to the transaction provider in the electronic receipt that the financial transaction is accepted by a user of the user device;

transmitting from either the transaction provider or the user device to a user information system at least the electronic receipt; and storing at least the electronic receipt with the user information system when at least the electronic receipt is verified by the user information system to have been accepted by the user of the user device.

45. A process in accordance with claim 44 wherein:

the user device adds to the electronic receipt additional information which is used by the user information system in processing at least the electronic receipt stored by the user information system.

46. A process in accordance with claim 44 wherein:
the information provided by the user device to the transaction provider to permit the transaction provider to verify that the electronic receipt is accepted by the user of the user device comprises an electronic signature.

47. A process in accordance with claim 46 wherein:
the user information system also verifies at least any received electronic receipts with the electronic signature.

48. A process in accordance with claim 44 wherein:
the transaction provider also provides to the user device electronic data identifying financial transactions which are offered by the transaction provider.

49. A process in accordance with claim 44 wherein:
the user information system comprises a processor and a memory with the memory storing at least electronic receipts only after the verification of acceptance of the electronic receipts by the user; and
the processor provides at least one of accounting service and financial management service to the user.

50. A process for collecting transaction data comprising:
providing form a transaction provider to a user device at least an electronic receipt of a financial transaction obtained by the user from the transaction provider;
providing a verification from the user device to the transaction provider in the electronic receipt that the financial transaction is accepted by a user of the user device;
transmitting information relating to the accepted financial transaction from the transaction provider to an intermediate service provider;
processing the information relating to the accepted financial transaction with the intermediate service provider to produce processed information pertaining to the accepted financial transaction; and
receiving at least the electronic receipt with a user information system from the intermediate service provider and storing at least the electronic receipt when at least the electronic receipt is verified by the user information system to have been accepted by the user of the user device.

51. A process in accordance with claim 50 wherein:
the intermediate service provider is a financial institution which processes the information relating to the selected financial transaction against an account which the user has with the intermediate service provider.

52. A process in accordance with claim 50 wherein:
the user device adds to the electronic receipt additional information which is used by the user information system in processing at least the electronic receipt stored by the user information system.

53. A process in accordance with claim 50 wherein:
the information provided by the user device to the transaction provider to permit the transaction provider to verify that the electronic receipt is accepted by the user of the user device comprises an electronic signature.

54. A process in accordance with claim 53 wherein:
the user information system also verifies at least any received electronic receipts with the electronic signature.

55. A process in accordance with claim 50 wherein:
the user device encrypts an identity of the user from at least the transaction provider.

56. A process in accordance with claim 55 wherein:
the user device also encrypts the contents of the electronic receipt from being accessed by the intermediate service provider.

57. A process in accordance with claim 51 wherein:
the financial institution validates the information relating to the accepted financial transaction is correct as associated with the account of the user.

58. A process in accordance with claim 57 wherein:
the financial institution provides information to the user information system that the financial transaction has occurred between the user and transaction provider.

59. A process in accordance with claim 50 wherein:
the intermediate service provider provides the transaction provider with an analysis of financial transactions accepted by the user of the user device.

60. A process in accordance with claim 59 wherein:
the analysis is a statistical analysis.

61. A process in accordance with claim 50 wherein:
the transaction provider provides an analysis of sales of particular types of financial transactions to manufacturers of products which are involved with the sale.

62. A process in accordance with claim 61 wherein:
the analysis involves at least one of location and time that the sales were made.

63. A process in accordance with claim 50 wherein:
the transaction provider creates profiles of a user of the user device based on types of purchases which are made.

64. A process in accordance with claim 50 wherein:
the transaction provider provides a tabulation of purchases made by users of the user device.

65. A process in accordance with claim 64 wherein:
the tabulation is provided by the transaction provider to a manufacturer of products purchased with each financial transaction.

66. A process in accordance with claim 50 wherein:
the intermediate service provider provides the history of a user financial transaction to another for a benefit of the user.

67. A process in accordance with claim 50 wherein:
the intermediate service provider provides a user of the user device with an analysis of the user's history of financial transactions.

68. A process in accordance with claim 67 wherein:
the analysis identifies types of financial transactions which the user has accepted.

69. A process in accordance with claim 68 wherein:
the analysis groups products which are involved in financial transactions according to categories.

70. A process in accordance with claim 68 wherein:
the analysis compares the user's history of financial transactions with a history of financial transactions of others.

71. A process in accordance with claim 50 wherein:
the user device is used by members of an organization and information of multiple users is combined in the user information system.

72. A process in accordance with claim 50 wherein:
the user information system comprises a processor and a memory with the memory storing at least electronic receipts only after the verification of acceptance of the electronic receipts by the user; and
the processor provides at least one of accounting service and financial management service to the user.

73. A process in accordance with claim 72 wherein:

the user information system stores in the memory transaction information of the user, is operated by a company physically separated from the user and is connected to the user device by a wireless link.

74. A process in accordance with claim 50 wherein:

the user information system comprises a processor and a memory with the memory storing at least electronic receipts only after the verification of acceptance of the electronic receipts by the user; and the processor provides at least one of accounting service and financial management service to the user.

75. A process in accordance with claim 74 wherein:

the user information system stores in the memory transaction information of the user, is operated by a company physically separated from the user and is connected to the user device by a wireless link.

76. A system for collecting transaction data comprising:

a plurality of transaction providers, each transaction provider providing at least an electronic receipt of financial transactions obtained therefrom;

a plurality of user devices, in communication with the plurality of transaction providers, which provide to at least one transaction provider a selection by a user of each user device of an offered financial transaction and in response to receipt of an electronic receipt an acceptance of the transaction recorded in the received electronic receipt;

at least one intermediate service provider, coupled to each transaction provider, which processes information relating to the accepted financial transaction transmitted by each transaction provider to the at least one intermediate service provider to produce processed information pertaining to the selected financial transaction; and at least one user information system, coupled to at least one intermediate service provider, each user information system storing at least electronic receipts which are received from each intermediate service provider which are verified by the at least one user information system to have been accepted by the user of each user device.

77. A system in accordance with claim 76 wherein:

the intermediate service provider provides to at least one user of the user devices information on price differences at different locations at which the plurality of transaction providers are located.

78. A system in accordance with claim 76 wherein:

the user information system comprises a processor and a memory with the memory storing at least electronic receipts only after the verification of acceptance of the electronic receipts by the user; and the processor provides at least one of accounting service and financial management service to the user.

79. A system in accordance with claim 78 wherein:

the user information system stores in the memory transaction information of the user, is operated by a company physically separated from the user and is connected to the user device by a wireless link.

* * * * *